(12) United States Patent
Fernandez Alonso et al.

(10) Patent No.: US 10,576,723 B2
(45) Date of Patent: Mar. 3, 2020

(54) HYBRID TOOL FOR CURING PIECES OF COMPOSITE MATERIAL

(71) Applicant: Airbus Operations, S.L., Getafe (ES)

(72) Inventors: Alejandro Fernandez Alonso, Getafe (ES); Aquilino Garcia Garcia, Getade (ES); Jorge Juan Galiana Blanco, Getafe (ES); Pablo Cebolla Garrofe, Getafe (ES); Carlos Romon Banogon, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 1113 days.

(21) Appl. No.: 14/288,931

(22) Filed: May 28, 2014

(65) Prior Publication Data
US 2014/0352877 A1    Dec. 4, 2014

(30) Foreign Application Priority Data

May 30, 2013  (EP) .................................... 13169874

(51) Int. Cl.
*B32B 38/00*    (2006.01)
*B29C 33/40*    (2006.01)
(Continued)

(52) U.S. Cl.
CPC .............. *B32B 38/00* (2013.01); *B29C 33/38* (2013.01); *B29C 33/405* (2013.01); *B29C 70/44* (2013.01);
(Continued)

(58) Field of Classification Search
CPC . B29C 33/3828; B29C 33/306; B29C 33/307; B29C 33/038405; B29C 33/40;
(Continued)

(56) References Cited

U.S. PATENT DOCUMENTS 3,343,770 A * 9/1967 Szonn ...................... F16F 1/36
                                                      188/242
4,331,723 A * 5/1982 Hamm .................. B29C 70/865
                                                      156/293
(Continued)

FOREIGN PATENT DOCUMENTS

CN    102196962    9/2011
CN    102990943    3/2013
(Continued)

OTHER PUBLICATIONS

European Search Report, dated Dec. 12, 2013.
Chinese Office Action, dated Feb. 24, 2017, corresponding application.

*Primary Examiner* — Michael N Orlando
*Assistant Examiner* — Marta S Dulko
(74) *Attorney, Agent, or Firm* — Greer, Burns & Crain, Ltd.

(57) ABSTRACT

A hybrid tool for curing composite structures for aircrafts, such as stringers, torsion boxes, skin panels, wing surfaces, horizontal tail or vertical stabilizers, etc. The hybrid tool comprises a metallic portion and an elastic portion arranged on a surface of the metallic portion. The elastic portion and the metallic portion are permanently joined to each other so that the metallic portion and the elastic portion together define a surface having a shape which copies at least part of a surface of a piece of composite material to be cured. The tool is capable of satisfactorily curing pieces of composite material which have a minimum thickness and/or a very aggressive change of thickness.

13 Claims, 6 Drawing Sheets

(51) Int. Cl.
  *B29C 33/38* (2006.01)
  *B29L 31/00* (2006.01)
  *B29C 70/44* (2006.01)
  *B29L 31/30* (2006.01)
(52) U.S. Cl.
  CPC .......... *B29K 2995/007* (2013.01); *B29K 2995/0046* (2013.01); *B29L 2031/001* (2013.01); *B29L 2031/003* (2013.01); *B29L 2031/3076* (2013.01); *B29L 2031/3082* (2013.01); *B29L 2031/3085* (2013.01); *B32B 2038/0076* (2013.01); *B32B 2305/77* (2013.01); *Y10T 156/1002* (2015.01)
(58) Field of Classification Search
  CPC .. B29C 66/347; B29C 66/0044; B29C 66/326
  See application file for complete search history.

(56) References Cited

U.S. PATENT DOCUMENTS

| | | | | |
|---|---|---|---|---|
| 4,932,857 A * | 6/1990 | Nishino | ............... | B29C 43/3607 425/394 |
| 5,015,168 A * | 5/1991 | Boime | ................... | B29C 70/42 264/552 |
| 5,203,940 A * | 4/1993 | Krone | ................... | B29C 53/04 156/196 |
| 5,290,499 A * | 3/1994 | Tischler | ............... | B29C 33/0038 264/301 |
| 5,593,633 A * | 1/1997 | Dull | ........................ | B29C 70/44 156/285 |
| 6,197,146 B1 | 3/2001 | Sucic et al. | | |
| 6,245,275 B1 * | 6/2001 | Holsinger | ............ | B29C 70/342 249/127 |
| 7,413,695 B2 * | 8/2008 | Thrash | .................. | B29C 70/443 264/257 |
| 2001/0035249 A1 * | 11/2001 | Kondo | ................... | B29C 70/345 156/65 |
| 2002/0027187 A1 * | 3/2002 | Sato | ....................... | B29C 70/44 249/187.1 |
| 2005/0211846 A1 | 9/2005 | Leon-Dufour et al. | | |
| 2006/0145012 A1 | 7/2006 | Hernandez | | |
| 2009/0008825 A1 | 1/2009 | Eberth et al. | | |
| 2009/0148647 A1 | 6/2009 | Jones et al. | | |
| 2010/0314042 A1 * | 12/2010 | Luebbering | ........... | B29C 33/405 156/286 |
| 2010/0314807 A1 * | 12/2010 | Lengsfeld | ........... | B29C 43/3642 264/571 |
| 2011/0315307 A1 | 12/2011 | Perez Pastor et al. | | |
| 2012/0086152 A1 * | 4/2012 | McMillan | ............. | B29C 35/002 264/327 |
| 2012/0100343 A1 | 4/2012 | Borghini-Lilli et al. | | |
| 2013/0108837 A1 | 5/2013 | Blot | | |

FOREIGN PATENT DOCUMENTS

| | | |
|---|---|---|
| DE | 102009023864 | 12/2010 |
| EP | 1031406 | 8/2000 |
| EP | 1238785 | 9/2002 |

* cited by examiner

HYBRID TOOL FOR CURING PIECES OF COMPOSITE MATERIAL

CROSS-REFERENCES TO RELATED APPLICATIONS

This application claims the benefit of the European patent application No. 13169874.8 filed on May 30, 2013, the entire disclosures of which are incorporated herein by way of reference.

BACKGROUND OF THE INVENTION

The present invention refers in general to a tooling for the manufacture of composite (CFRP) structures for aircraft, such as stringers, torsion boxes, skin panels, wing surfaces, horizontal tail or vertical stabilizers (HTP & VTP), etc.

More in particular, it is an object of the present invention to provide a tooling capable of satisfactorily curing pieces of CFRP, having parts with minimum thickness and/or very aggressive thickness changes.

The use of composite materials formed by an organic matrix and unidirectionally orientated fibers, such as Carbon Fiber Reinforced Plastic (CFRP), to construct several structural components of an aircraft, for example fuselage skin panels, torsion boxes, stringers, ribs, spars etc., is well known in the aeronautical industry.

Typically, skin panels are stiffened with a plurality of stringers (stiffeners) longitudinally arranged, so that the stringers improve the strength and buckling behavior of the skin panels. The stringers are conventionally bonded to the skin panel by co-curing or by co-bonding both parts together, or simply by applying a layer of adhesive (secondary-bonding).

The end of the stringer causes a redistribution of the loads being supported by the stringer and the skin. This produces two effects:

- while the bending of the reinforced cover produces traction and compression loads, this punctual change in the structure of the stringer (stringer run-out), causes a moment in its termination point which tends to de-bond the bonding line between stiffener and skin.
- at the same time, the redistribution of the loads has to be achieved through the bonding line in order to transfer it from the stringer to the skin at the stringer run-out area. At high load levels (as experimented for example in the wing cover) the resistance of the bonding lines could be compromised.

The co-bonded union between skin and stringers in the torsion boxes of aircraft wings has to withstand loads in the magnitude of tons, which are at the limit of the structural capacity of said union at some critical spots, like the stringer run out area. These co-bonded unions can crack at this spot at high loads causing peeling loads due to two effects: elimination of the stringer web which causes a high load peak; and the main stringer termination, which produces a peak in the shear loads. In a typical configuration, these scenarios occur at the same time, penalizing the structural behavior of the bonding line.

To overcome these problems associated with the load transfer at stringer run-outs, it is well-known in this technical field, to reduce the total cross-sectional area of the stringer, usually by means of reducing the height of the stringer web (typically by cutting off a piece of it), and by progressively reducing the thickness of the stringer foot towards the run-out, by sequentially reducing the number of plies (dropping plies) towards the run-out.

FIG. 1 shows a conventional run-out section of a stringer (1) joined to a skin panel (2), wherein the stringer (1) has a T-shaped cross-section formed by a web (3) and a foot (4). As it can be observed in drawings (a, b) of FIG. 1, the thickness of the web (3) and foot (4) is reduced progressively towards the end of the stringer in order to reduce the cross-sectional area of the same, thereby reducing the elastic module of this run-out section.

Examples of this conventional solution are described in more detail for example in US patent applications US 2005/0211846 A1 and US 2012/0100343 A1.

However, existing metallic tools for curing pieces of composite material are not capable of satisfactorily manufacturing stringers with abrupt thickness reductions, as required for example for the web and foot of a run-out section. The existing metallic tooling is only capable of manufacturing ply drop offs of typically 1:200 (slope), which is not enough for some demanding applications.

If a metallic tool were to be used to cure a part with a ply drop-off bigger than 1:200, porosity problems would appear in the resulting piece, affecting the quality of the same. Tooling manufacturing tolerances and positioning tolerances due to slippage between the tool and the composite ply stack (5) would create gaps and misalignments between the tool fixed in place and the ply stacks (5) to be cured to form the composite material stringer.

FIG. 2 illustrates how these porosity problems are originated by gaps (7) created between the fresh stack of plies (5) of composite material, and hard tooling areas of the metallic tool (6) in contact with said plies (5) once the metallic tool is positioned for the curing process. During this curing process, a fresh (not-cured) formed stack of plies (5) of carbon fiber is heated and pressed against a metallic mold (5) by the application of a vacuum, so that the stack of plies (5) is cured and at the same time compacted by the metallic tool (6).

However, if there is a gap (7) between the working surface (8) (surface in contact with the stack of plies (5)) of the metallic tool (6) and the stack of plies (5), the uncured thermosetting resin of the composite material of the plies (5) flows towards those gaps (7) due to the effect of the applied vacuum. If the gap is too big, the resin cannot fill the entire gap originating said porosity problems in the resulting piece. This gap (7) is considered too big when the slope of the tooling is bigger than 1:200 for the typical manufacturing tolerances in a thickness of the typical stringers.

The same limitations affect the manufacturing of other CFRP structural elements with abrupt thickness change.

SUMMARY OF THE INVENTION

The present invention is defined in the independent claim, and satisfactorily solves the above-described problems of existing tooling for curing CFRP pieces with demanding thickness changes and/or minimum thickness, which cannot be manufactured using conventional metallic tools. Preferred embodiments of the invention are defined in the dependent claims.

More in particular, the invention refers to a hybrid tool suitable for curing pieces of composite material, wherein the tool has a contact surface with a shape form or adapted to substantially match the shape of a composite material part (formed at a previous stage) to be cured. Said contact surface is formed by two surfaces of a different nature, namely a metallic surface and an elastic surface arranged in the tool in correspondence with the section with minimum thickness and/or very aggressive thickness changes of the piece to be cured. Preferably, the elastic surface is arranged in correspondence with the run-out section of the tool, and the metallic surface is arranged at an inner section of the tool.

The metallic portion of the tool, is a conventional metallic tool, usually made of invar, steel or any other kind of metallic material suitable for this purpose, which is similar to the tools of the prior art, and which extends over a major part of the tool except for the run-out section.

The elastic portion of the tool is made of a material capable of elastically modifying its volume and shape, that is, a material which is deformed due to an external force and which returns to its original shape when the external force is removed. The elastic portion is provided on a part of the interior surface of the metallic portion, that is, on the surface of the metallic portion which is meant to be in contact with the CFRP piece to be cured along the run out section of the stringer to be cured, and in such a manner that the metallic portion acts as a support or substrate for the elastic portion.

Preferably the elastic part is made of an elastomeric material, since the elastic and strength properties of this material, makes it suitable for this particular application.

Therefore, an aspect of this invention refers to a hybrid tool for curing pieces of composite material, comprising at least one metallic portion and an elastic portion provided on a surface of the metallic portion.

Additionally, the elastic and the metallic portions are permanently joined to each other, which means that both portions remain fixed to each other during and after a curing process. Additionally, the metallic and elastic portions are arranged relative to each other, in such a manner that they form together a contact surface with a shape which copies or reproduces at least part of surface of a piece of composite material to be cured.

Having the elastic portion permanently joined to the metallic portion, has the effect that the elastic portion remains fixed in the same position relative to the metallic portion after a curing process is completed. Thus, the hybrid tool can be repeatedly used in many curing cycles, without the need of readjusting the position of the elastic portions after each cycle.

On the other hand, the elastic property of the elastic portion has the effect that porosity problems in the CFRP pieces to be obtained are prevented or at least significantly reduced. During the curing process, heat and pressure (vacuum) are conventionally applied to the hybrid tool and to the piece to be cured, so that, the vacuum applied causes the elastic portions to expand adapting its shape to the stack of plies and reducing therefore the volume of the cavities created between the tool and plies. Since the volume of those cavities is significantly reduced, any undesired flow of resin towards the cavities is prevented, thus, a pre-form of uncured composite piece with aggressive thickness change, can be cured satisfactorily.

Once vacuum is released, the elastic portion returns to its original shape and it is ready for the next curing cycle.

Contrary to the tooling of the prior art having exclusively hard or rigid metallic surfaces, the hybrid tool of the present invention is provided with a deformable surface where the elastic portion is provided.

Another object of the invention is a method for manufacturing composites structures of an aircraft, such as stringers, based on the use of the above-described hybrid tooling.

The invention also refers to a stringer for an aircraft made of composite material, which satisfactorily solves the before-mentioned problems associated to the load transfer at the stringer run-out.

One of the advantages of the invention is the capacity of manufacturing stringers with an aggressive drop off of plies, that is, an abrupt thickness diminution in both web and foot at the run-out section, achieving a thickness reduction of even 60-80% of the normal thickness or even less. These stringers can be manufactured repetitively with good quality.

The hybrid tool of the invention can also be advantageously used for the manufacture of other CFRP structures of an aircraft, such as skin panels, which are susceptible of optimization through an aggressive drop off of plies.

BRIEF DESCRIPTION OF THE DRAWINGS

Preferred embodiments of the invention are henceforth described with reference to the accompanying drawings, in which.

DETAILED DESCRIPTION OF THE PREFERRED EMBODIMENTS

Figure 1:
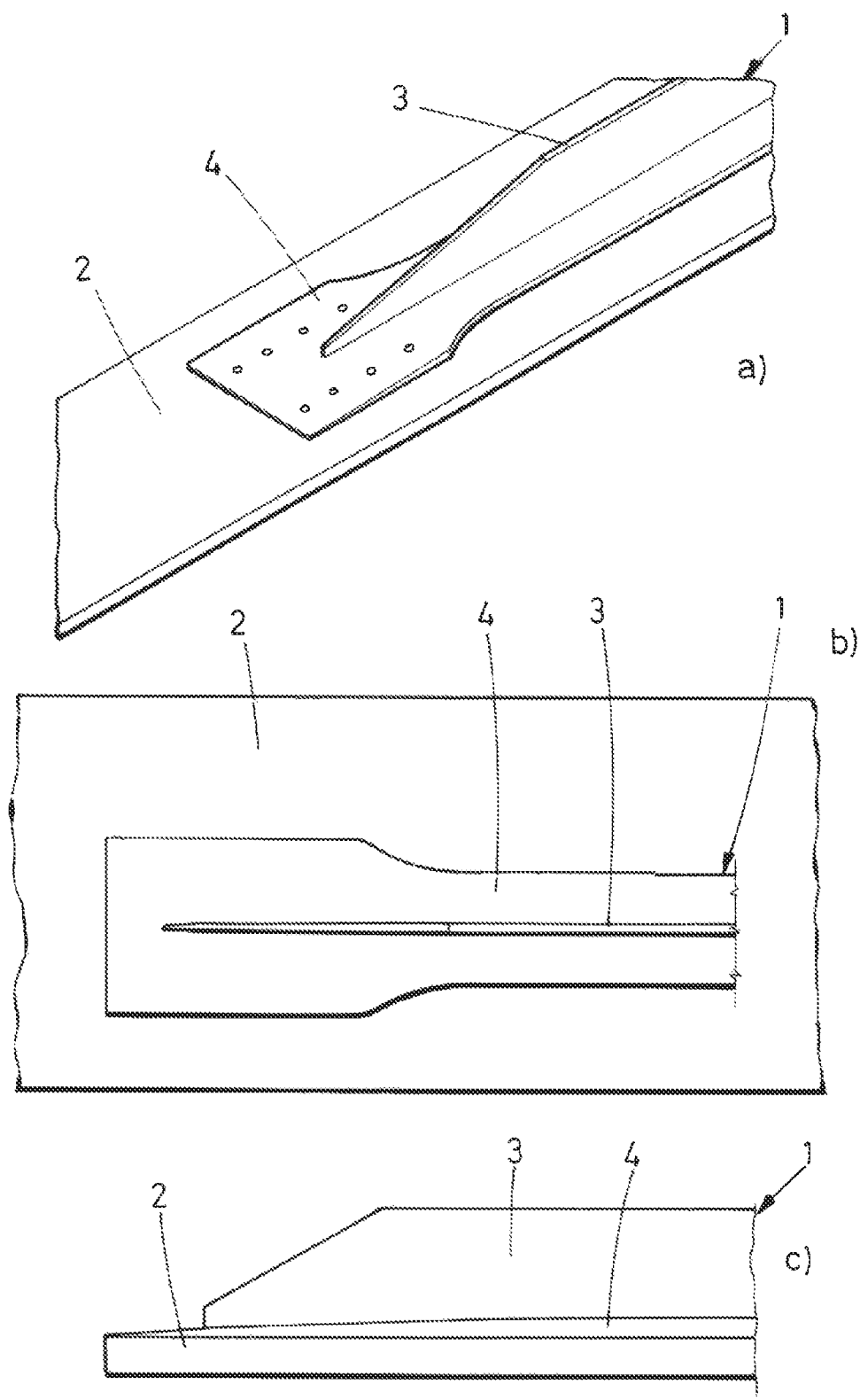
FIG. 1 shows a stringer run-out section, wherein drawing (a) is a perspective view of the stringer joined with a skin panel; drawing (b) is a top-plan view; and drawing (c) is a side-elevational view. A progressive thickness reduction, of both the web and foot of the stringer, can be observed respectively in drawings (b, c).
Figure 2:
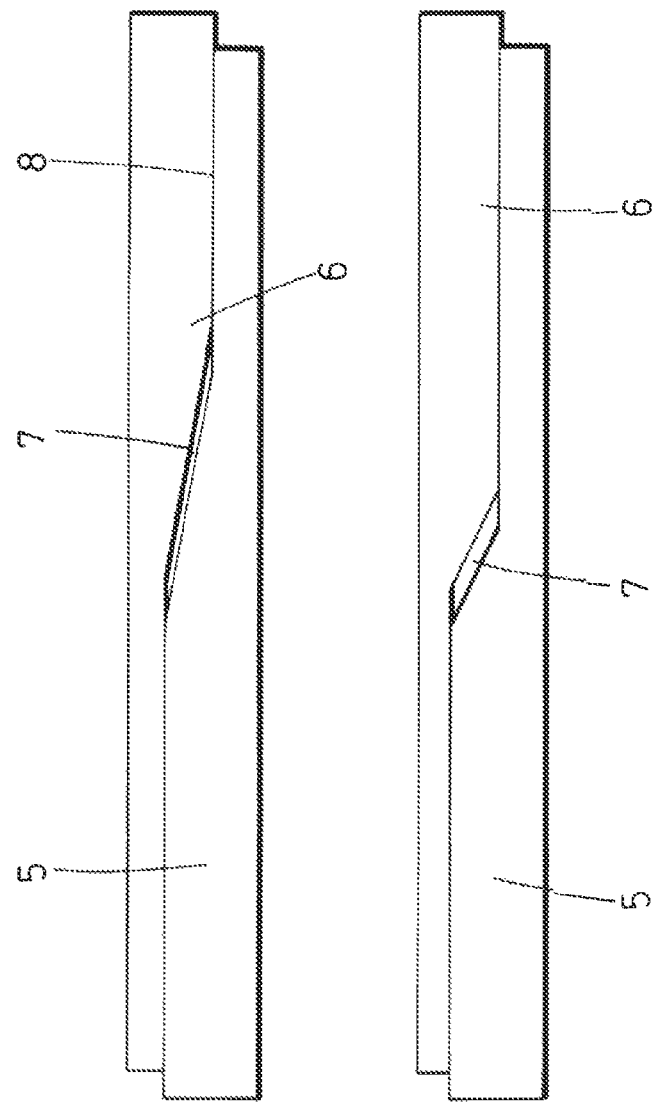
FIG. 2 is a schematic representation of two examples of the misalignment originated between an uncured composite part which has a section with reduced thickness, and a conventional metallic tool, and the gap generated due to that misalignment which causes porosity problems.
Figure 3:
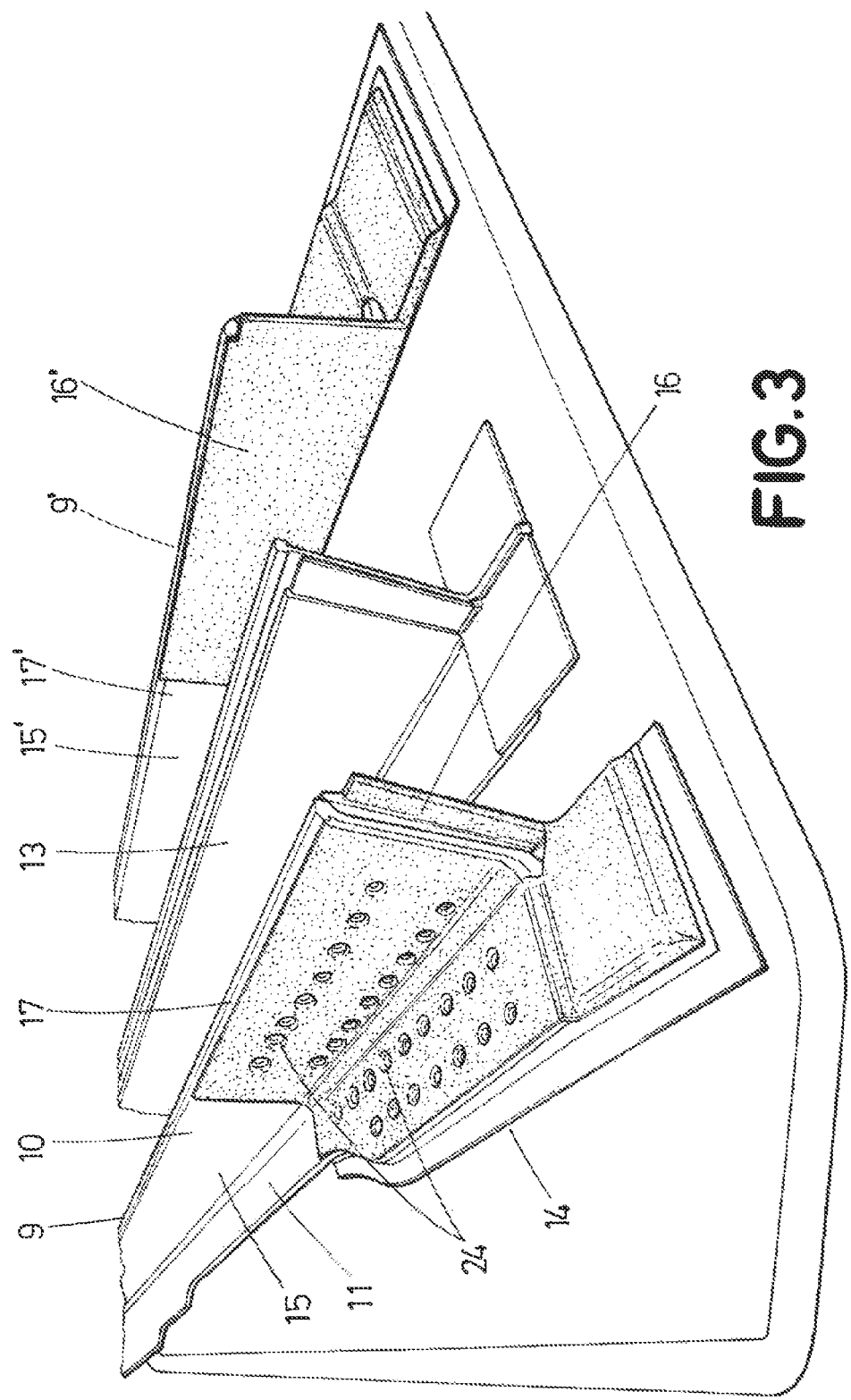
FIG. 3 shows a perspective view of a tool according to the invention, formed in this case by two symmetrical hybrid L-shaped tools. The figure also shows a male mold arranged between the two L-shaped tools. This male mold is used to form the elastic part over the respective metallic part, during the manufacturing process of the hybrid tool.
Figure 5:
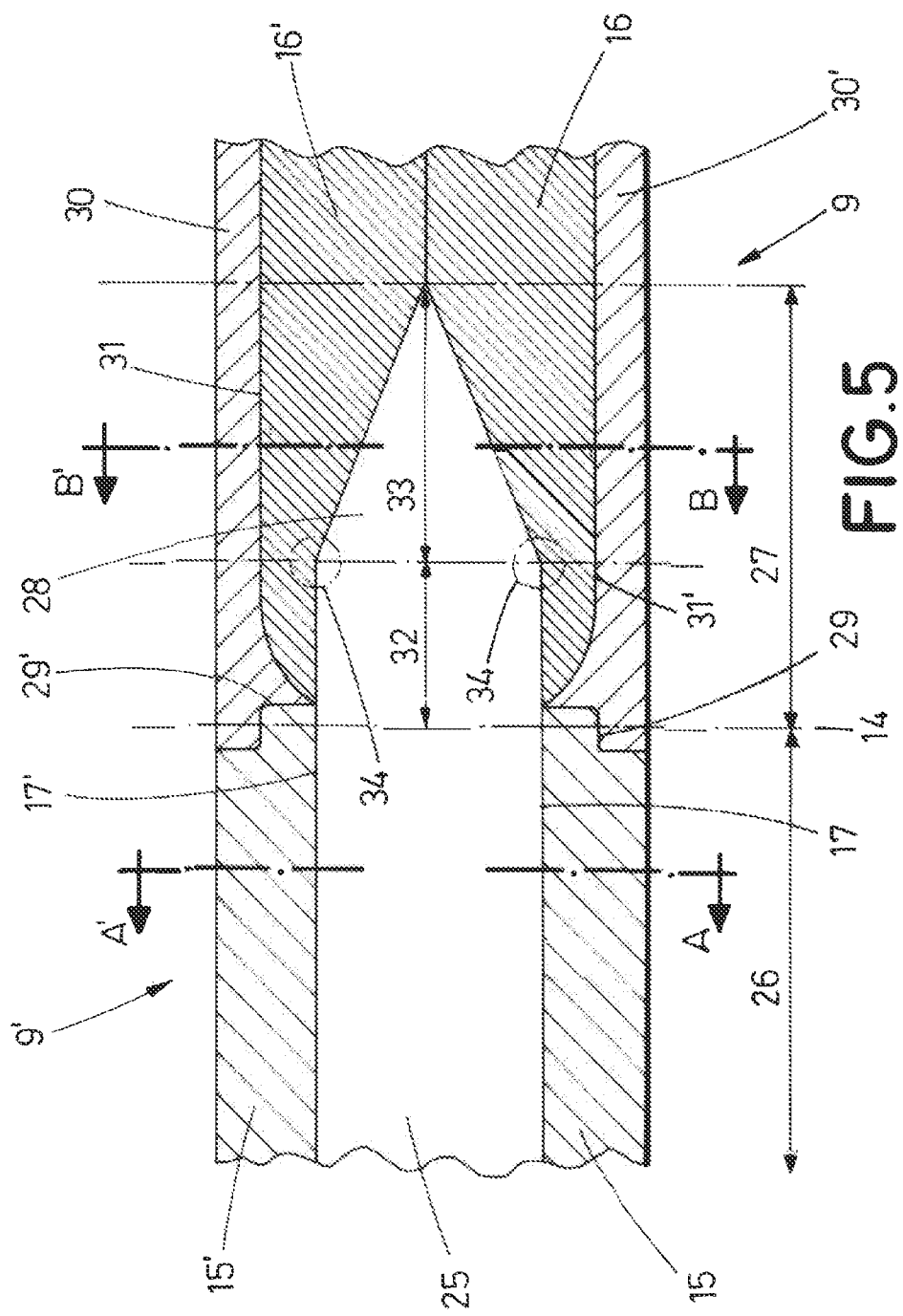
FIG. 5 shows a schematic representation of a cross-sectional view taken along the web section of a hybrid tool according to the invention, formed by two symmetrical L shaped parts in an operating position for curing a composite piece, for example a T-shaped stringer.

FIG. 3 shows an hybrid tool (14) for curing pieces of composite material according to a preferred embodiment of the invention, wherein the tool (14) includes first and second L-shaped parts (9, 9') which are symmetrical to each other, and are configured for curing a T-shaped stringer when they are coupled to each other as shown in FIG. 5.

Each of the L-shaped parts (9, 9') comprises a metallic portion (15, 15') and an elastic portion (16, 16') arranged on the inside surface of the respective metallic portions (15, 15'), in such a manner that both portions (15, 15', 16, 16') together define a contact surface (17, 17') meant to be in contact with a the composite part (25) (preform) to be cured.

For that purpose, that contact surface (17, 17') has a shape which copies at least part of a surface of a piece (25) of composite material.

FIG. 3 also shows a male mold (13), typically made of aluminum, arranged between the two L-shaped parts, which is used to form the elastic portion (16, 16') over the respective metallic portion (15, 15'), during the manufacturing process of the two parts (9, 9') of the. The male mold (13) reproduces the shape of the part to be cured, thus, it is manufactured with the desired slope or thickness reduction at its run-out section so that the elastic portion (16, 16') is formed with the shape of that slope.

Preferably, the elastic portion (16, 16') is made of an elastomeric material.

Each of these two parts (9, 9') of FIG. 3, is formed by a foot part (11) and a web part (10), and wherein the elastic portion (16) is provided on both, the inner surface of the web part (10) and on the inner surface of the foot part (15). The elastic portion (16) is arranged at the run-section of each part, that is, adjacent to an end of the same.

Figure 4:
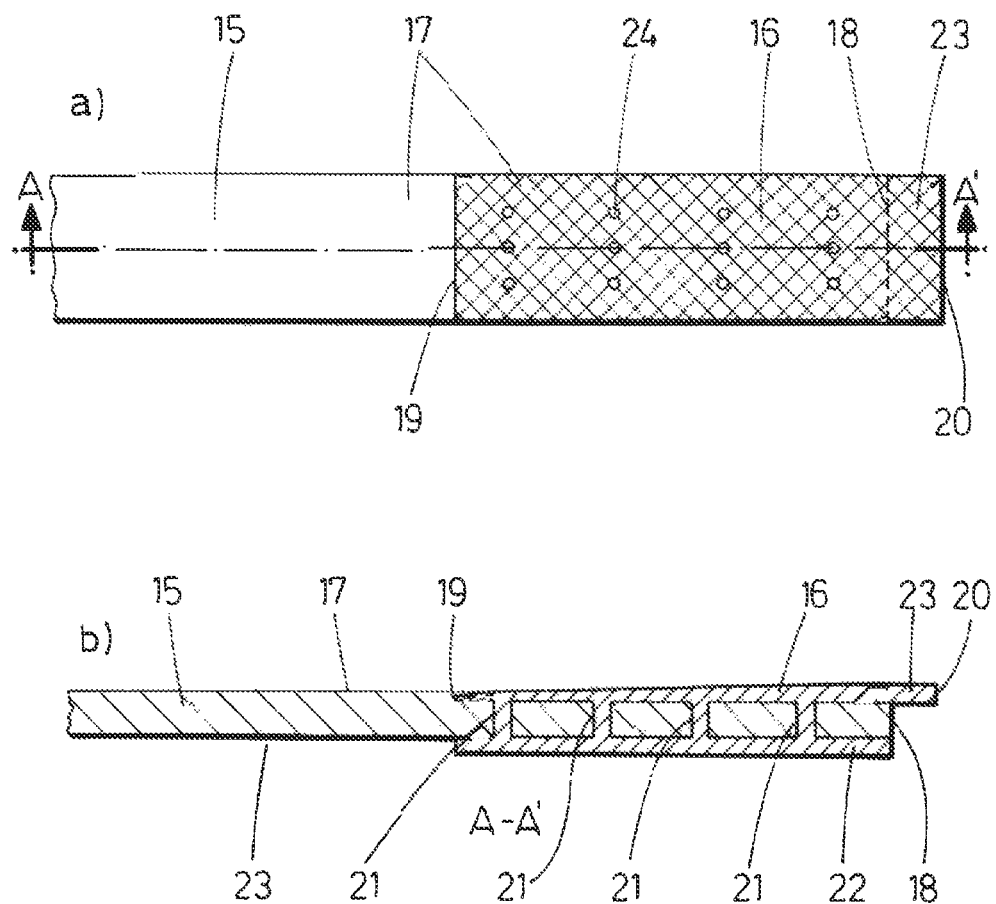
FIG. 4 shows an schematic representation of the web part of one of the hybrid tools of FIG. 3. Drawing (a) is a plan view of the contact surface; drawing (b) is a cross-sectional view taken along line A-A' in drawing (a). A cross-sectional view of the foot part of the hybrid tool, would produce a similar representation as the one shown in this figure.

As it can be observed in FIGS. 3 and 4, the metallic portion (15) is an elongated body and the elastic portion (16) is arranged on an area of the metallic portion adjacent to one of its distal ends (18) (corresponding to the run-out section), so that these two portions are arranged to define or form together a working or contact surface (17) with the shape of a form composite piece to be cured (25), the contact surface (17) matches the shape of the outer surface of the web and foot parts of a T-shaped stringer.

As it can observed more clearly in FIG. 4(b), part of the metallic portion (15) acts as a back support for the elastic portion (16), and the thickness of the longitudinal cross-section of the elastic portion (16) increases from an interior end (19) to an exterior end (20) of the elastic portion (16), to form a slope with the required shape corresponding to the run-out section of a pre-formed stringer with an abrupt thickness reduction.

The elastic portion (16) is in direct contact with a surface of the metallic portion (15), as shown more clearly in FIG. 4, and it may be fixed to the metallic portion for example by means of an adhesive. Alternatively, the metallic and the elastic portions are configured in such a manner that they engage with each other to remain permanently fixed. In the exemplary embodiment of FIGS. 3 and 4, that engagement is obtained by a plurality of perforations (21) through the metallic portion (15), so that part of the elastomeric material penetrates into those perforations (21) during the curing process of that material.

A support layer (22) also made of the same elastomeric material as the elastic portion (16), is laminated on the outer surface (23) of the metallic portion (15), so that the elastomeric material fills those perforations (21) and the support layer and the elastic portion are physically connected as an integral part.

The elastic portion (16) may extend beyond the distal end (18) of the metallic portion, to form a flap (23) which is not supported by the metallic portion. This flap (23) provided in both parts (9, 9') of the tool, serves to close the chamber between these two parts during a curing process, in order to prevent the resin from flowing out of that chamber.

Alternatively, the elastic portion (16, 16') extends on the whole metallic portion (15), or at least on a major part of it, in order to avoid porosity problems in the whole extend of the composite piece to be cured not only at the run-out. An additional advantage of that arrangement is that any defect on that metallic surface is covered by the elastomeric material.

Due to the large length and weight of these tools, conventionally these tools are formed by several segments coupled together as shown in FIG. 5. An inner segment (26) is a conventional metallic tool, arranged in correspondence with a central part of the piece (25) to be cured. At the end of the tool in correspondence with the run-out, an outer segment (27) of the tool (14) is configured according to the invention, having an elastic portion (16, 16') formed with the shape of the run-out (28) of the piece (25).

The two symmetrical metallic parts (30, 30') of the outer segment (27), have a recessed area (31, 31') for receiving the elastic portion (16, 16') as shown in FIG. 5. The elastic portions (16, 16') have a transition zone (32) where the interior surface of the elastic portions (16, 16'), is flush with the interior surface of the inner segment (26). The elastic portions (16, 16') also have a run-out zone (33) shaped as a slope or ramp. The contact surface (17, 17') of the tool (14), is formed by the interior surface of the metallic and the elastic portions (15, 15', 16, 16').

The provision of the transition zone (32) in the elastic portions (16, 16') has the effect and advantage that the zone more affected by the porosity problems, that is, the inflection zone (24) wherein the run-out zone (33) begins, is entirely formed by elastic material (16, 16'), thus, porosity problems are reduced at the entire zone. These outer and inner segments (27, 26) of the hybrid tool (14) are provided with a stepped configuration (29, 29') at one of their ends, which are complementary to each other for coupling both segments. The contact surface (17, 17') of the tool (14) is formed by the interior surface of the metallic and the elastic portions (15, 15', 16, 16').

The invention also refers to a method for manufacturing the before-described hybrid tool, which comprises the following steps:
- manufacturing a metallic male portion (13) with the shape of the piece to be cured,
- manufacturing the metallic portions (15, 15'),
- laminating several layers of raw elastomeric material, on a surface of the metallic portion, until the desired thickness of elastomeric material is obtained,
- curing the raw elastomeric material by applying heat and pressing the elastomeric material against the male mold (13), in order to form the elastomeric material the mold,
- de-molding the hybrid tool from the male mold (13).

Figure 6:
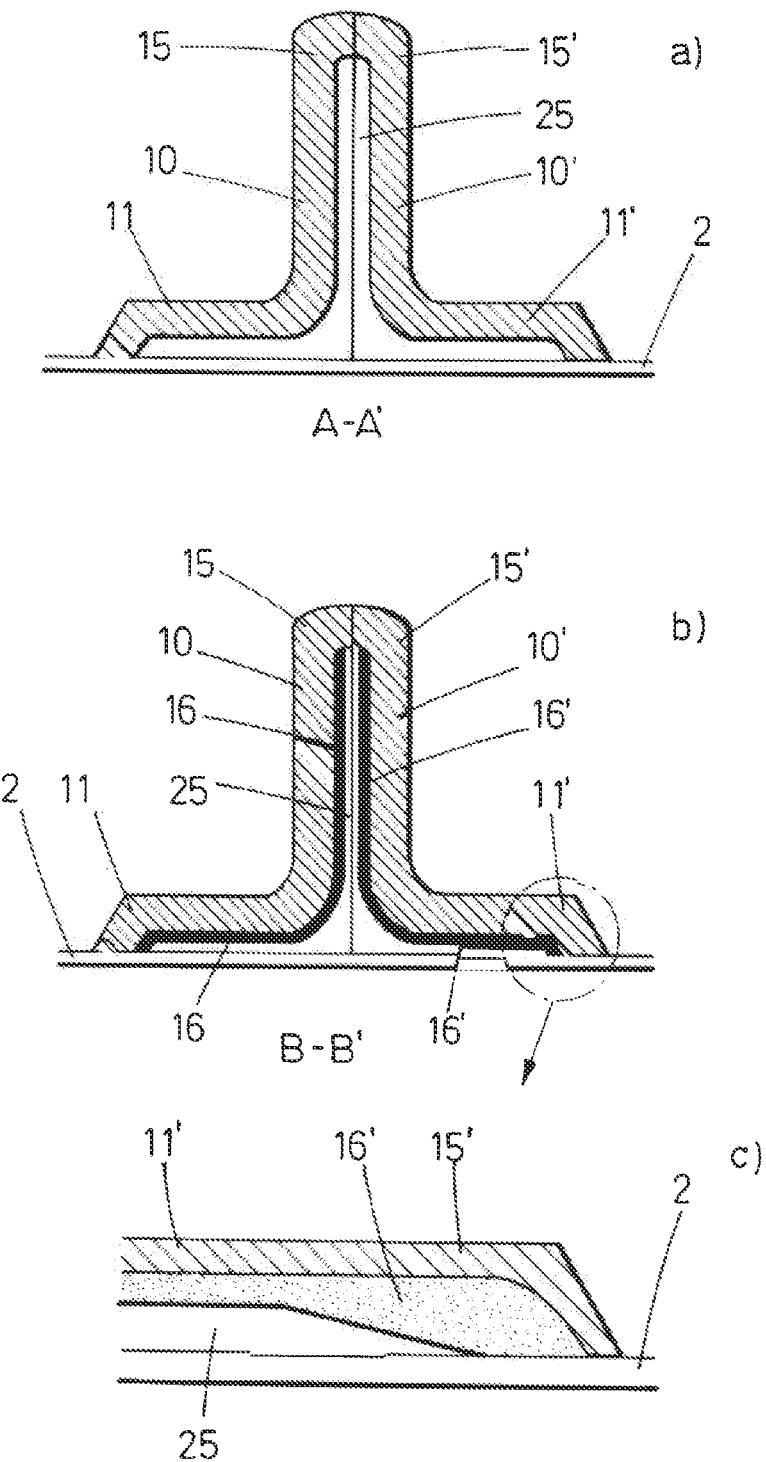
FIG. 6 shows in drawing (a) a schematic representation of a transversal cross-sectional view taken at line A-A' in FIG. 5; drawing (b) is a transversal cross-sectional view taken along line B-B' in FIG. 5 corresponding to the run-out section of two parts of the hybrid tool in an operating position; and drawing (c) is an enlarged view of the foot part in drawing (b).

For the manufacture of hybrid tools as the one shown in FIG. 5 or 6, several perforations (21) are opened in the metallic portion and raw elastomeric material is also laminated on the outer surface (23) of the metallic portion. During the curing cycle, the elastomeric material is heated and due to the action of the vacuum applied, part of that elastomeric material flow into the perforations (21) connecting the support (22) and the elastic portion (16). This process causes some depressions (24) to appear on the support (22), as shown for example in FIG. 3.

The present invention allows the manufacture of any kind of ramps for any kind of stiffener shape and in any section of the same, where the ramps are more aggressive or the thickness are bellow than those allowed by conventional metallic tooling. As a preferred example, T-shaped stringers with abrupt ramps at their run-out (SRO) section can be manufactured using the hybrid tool of the invention, which in turn allows the optimization of the behavior of structures such as skin reinforced with stringers.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A hybrid curing tool for curing pieces of composite material, comprising:
   a first metallic portion comprising a generally elongated surface comprising perforations forming apertures therethrough in a pattern along a segment of the first metallic portion extending from a midsection to an end of the first metallic portion;
   a second metallic portion having a surface complementary to a portion of the generally elongated surface of the first metallic portion wherein a piece of composite material to be cured is supported therebetween;
   a first elastic portion attached to the first metallic portion from the midsection to the end of the first metallic portion, the first elastic portion extending through the perforations;
   a first contact surface extending from a distal end of the first metallic portion to the end of the first metallic portion and defined by a first segment of the generally elongated surface of the first metallic portion from the distal end of the first metallic portion to the midsection of the first metallic portion which is free of the first elastic portion and a second segment of the generally elongated surface of the first metallic portion extending from the midsection of the first metallic portion to the distal end of the first metallic portion which has the first elastic portion deposited thereon;
   a second contact surface extending from a distal end of the second metallic portion to an end of the second metallic portion;
   wherein the first elastic portion forms a tapering profile such that a thickness of the first elastic portion forming the first contact surface has a thickness which progressively increases from the midsection of the first metallic portion to the distal end of the first metallic portion; and
   wherein first and second contact surfaces are complementary such that a space is formed therebetween when portions of the first and second metallic portions are brought into face-to-face relationship, the space having a shape which copies at least part of a tapering surface of a piece of composite material to be cured, and further comprising:
   a recessed area formed in the generally elongated surface of the first metallic portion relative to an adjacent portion of the generally elongated surface of the first metallic portion wherein the first elastic portion is provided within the recessed area,
   wherein the first elastic portion within the recessed area comprises a transition zone wherein a surface of the transition zone is flush with the adjacent portion of the generally elongated surface of the first metallic portion.

2. The hybrid curing tool for curing pieces of composite material of claim 1 further comprising:
   a second elastic portion attached to the second metallic portion from a midsection of the second elastic portion to the end of the second metallic portion.

3. The hybrid curing tool for curing pieces of composite material of claim 2 wherein the surface of the second metallic portion complementary to a portion of the generally elongated surface of the first metallic portion comprises perforations forming apertures therethrough in a pattern along a segment of the second metallic portion extending from the midsection to the end of the second metallic portion, wherein the second elastic portion extends through the perforations.

4. The hybrid curing tool for curing pieces of composite material of claim 3 wherein the second elastic portion forms a tapering profile such that a thickness of the second elastic portion forming a portion of the second contact surface has a thickness which progressively increases from the midsection of the second metallic portion to the distal end of the first metallic portion.

5. The hybrid curing tool for curing pieces of composite material of claim 4 wherein the first elastic portion covers opposing surfaces of the generally elongated surface of the first metallic portion, and wherein the second elastic portion covers opposing surfaces of the surface of the second metallic portion complementary to a portion of the generally elongated surface of the first metallic portion.

6. The hybrid curing tool for curing pieces of composite material of claim 5 wherein the first elastic portion on a first side of the generally elongated surface forms the tapering profile, and the first elastic portion on an opposing second side of the generally elongated surface of the first metallic portion forms a non-tapering profile from the midsection of the first metallic portion to the distal end of the first metallic portion.

7. The hybrid curing tool for curing pieces of composite material of claim 6 wherein the generally elongated surface of the first metallic portion and the surface of the second metallic portion complementary to a portion of the generally elongated surface of the first metallic portion are L-shaped.

8. The hybrid curing tool for curing pieces of composite material of claim 7 wherein the first elastic portion and the second elastic portion are L-shaped.

9. The hybrid curing tool for curing pieces of composite material of claim 8 wherein the first and second elastic portions are produced from an elastomeric material.

10. The hybrid curing tool for curing pieces of composite material of claim 9 wherein the first and second elastic portions are one of mechanically joined and glued to the first and second metallic portions, respectively.

11. The hybrid curing tool for curing pieces of composite material of claim 10 wherein the first elastic portion is made of an elastomeric material and the elastomeric material has been formed on the first metallic portion by heating and pressing the elastomeric material between the first metallic portion and a male mold.

12. A hybrid curing tool for curing pieces of composite material, comprising:
   a first metallic portion comprising a generally elongated surface comprising a recessed area formed in the generally elongated surface of the first metallic portion relative to an adjacent portion of the generally elongated surface of the first metallic portion;
   a second metallic portion having a surface complementary to a portion of the generally elongated surface of the first metallic portion wherein a piece of composite material to be cured is supported therebetween;
   a first elastic portion attached to the first metallic portion from the midsection to the end of the first metallic portion wherein the first elastic portion is provided within the recessed area, the first elastic portion within the recessed area comprising a transition zone wherein a surface of the transition zone is flush with the adjacent portion of the generally elongated surface of the first metallic portion;
   a first contact surface extending from a distal end of the first metallic portion to the end of the first metallic portion and defined by a first segment of the generally elongated surface of the first metallic portion from the distal end of the first metallic portion to the midsection of the first metallic portion which is free of the first elastic portion and a second segment of the generally elongated surface of the first metallic portion extending from the midsection of the first metallic portion to the distal end of the first metallic portion which has the first elastic portion deposited thereon;

a second contact surface extending from a distal end of the second metallic portion to an end of the second metallic portion;

a recessed area formed in the generally elongated surface of the first metallic portion relative to an adjacent portion of the generally elongated surface of the first metallic portion wherein the first elastic portion is provided within the recessed area;

wherein the first elastic portion forms a tapering profile such that a thickness of the first elastic portion forming the first contact surface has a thickness which progressively increases from the midsection of the first metallic portion to the distal end of the first metallic portion; and wherein first and second contact surfaces are complementary such that a space is formed therebetween when portions of the first and second metallic portions are brought into face-to-face relationship, the space having a shape which copies at least part of a tapering surface of a piece of composite material to be cured, wherein the first elastic portion within the recessed area comprises a transition zone wherein a surface of the transition zone is flush with the adjacent portion of the generally elongated surface of the first metallic portion.

13. A hybrid curing tool for curing pieces of composite material, comprising:

a first metallic portion comprising a generally elongated, L-shaped comprising perforations forming apertures therethrough in a pattern along a segment of the first metallic portion extending from a midsection to an end of the first metallic portion;

a second metallic portion having a generally elongated, L-shaped surface complementary to the generally elongated, L-shaped surface of the first metallic portion wherein a piece of composite material to be cured is supported therebetween, the generally elongated, L-shaped surface of the second metallic portion comprising perforations forming apertures therethrough in a pattern along a segment of the second metallic portion extending from a midsection to a proximate end of the first metallic portion;

a first elastic portion attached to the first metallic portion from the midsection to the end of the first metallic portion, the first elastic portion extending through the perforations wherein the first elastic portion and the first metallic portion are permanently joined to each other, wherein the first elastic portion covers opposing surfaces of the generally elongated, L-shaped surface of the first metallic portion;

a second elastic portion attached to the second metallic portion from the midsection to the end of the second metallic portion, the second elastic portion extending through the perforations wherein the second elastic portion and the second metallic portion are permanently joined to each other, wherein the second elastic portion covers opposing surfaces of the generally elongated, L-shaped surface of the second metallic portion;

a first contact surface extending from a distal end of the first metallic portion to the end of the first metallic portion and defined by a first segment of the generally elongated, L-shaped surface of the first metallic portion from the distal end of the first metallic portion to the midsection of the first metallic portion which is free of the first elastic portion and a second segment of the generally, elongated, L-shaped surface of the first metallic portion extending from the midsection of the first metallic portion to the distal end of the first metallic portion which has the first elastic portion deposited thereon;

a second contact surface extending from a distal end of the second metallic portion to the end of the second metallic portion and defined by a first segment of the generally elongated, L-shaped surface of the second metallic portion from the distal end of the second metallic portion to the midsection of the second metallic portion which is free of the second elastic portion and a second segment of the generally, elongated, L-shaped surface of the second metallic portion extending from the midsection of the second metallic portion to the distal end of the second metallic portion which has the second elastic portion deposited thereon;

a recessed area formed in the generally elongated surface of the first metallic portion relative to an adjacent portion of the generally elongated surface of the first metallic portion wherein the first elastic portion is provided within the recessed area;

wherein the first elastic portion forms a tapering profile such that a thickness of the first elastic portion forming the first contact surface has a thickness which progressively increases from the midsection of the first metallic portion to the distal end of the first metallic portion;

wherein the second elastic portion forms a tapering profile such that a thickness of the second elastic portion forming the second contact surface has a thickness which progressively increases from the midsection of the second metallic portion to the distal end of the second metallic portion;

wherein first and second contact surfaces are complementary such that a space is formed therebetween when portions of the first and second metallic portions are brought into face-to-face relationship, the space having a shape which copies at least part of a surface of a piece of composite material to be cured; and wherein the first elastic portion within the recessed area comprises a transition zone wherein a surface of the transition zone is flush with the adjacent portion of the generally elongated surface of the first metallic portion.

* * * * *